United States Patent [19]

Welsch et al.

[11] Patent Number: 5,108,330
[45] Date of Patent: Apr. 28, 1992

[54] METHOD FOR MANUFACTURING A GAS LASER HAVING A VACUUM-TIGHT CLOSURE

[75] Inventors: Wolfgang Welsch, Baldham; Hans Krueger, Munich, both of Fed. Rep. of Germany

[73] Assignee: Siemens Aktiengesellschaft, Munich

[21] Appl. No.: 736,644

[22] Filed: Jul. 26, 1991

[30] Foreign Application Priority Data

Aug. 7, 1990 [DE] Fed. Rep. of Germany ....... 4025047

[51] Int. Cl.⁵ .............................. H01S 3/03; H01J 9/40
[52] U.S. Cl. ............................................ 445/2; 445/3; 445/28; 445/43
[58] Field of Search ............................. 445/2, 3, 28, 43; 228/60

[56] References Cited

U.S. PATENT DOCUMENTS 3,141,225  7/1964  Watson ........................... 445/43
4,081,762  3/1978  Golser et al. ................... 331/94.5

FOREIGN PATENT DOCUMENTS 39794  10/1974  Japan ............................. 445/43

OTHER PUBLICATIONS

Siemens sales brochure entitled: "Für die He–Ne–Lasertechnik: Röhren, Module, Stromversorgungen", 1986/87.

Primary Examiner—Kenneth J. Ramsey
Attorney, Agent, or Firm—Hill, Van Santen, Steadman & Simpson

[57] ABSTRACT

A method of manufacturing gas lasers, such as He-Ne lasers or Ar lasers characterized by positioning the laser housing within a vacuum chamber, evacuating the vacuum chamber to evacuate the laser housing through a filling tube provided in the housing, baking the housing, then filling the vacuum chamber with the laser gas, which enters into the laser housing through the filling tube, subsequently forming a solder closure in the end of the sealing tube, the removing the laser housing from the vacuum chamber and subsequently permanently sealing the filling tube by pinching off the solder closure to form a cold-weld seal of the tube.

15 Claims, 1 Drawing Sheet

U.S. Patent Apr. 28, 1992 5,108,330
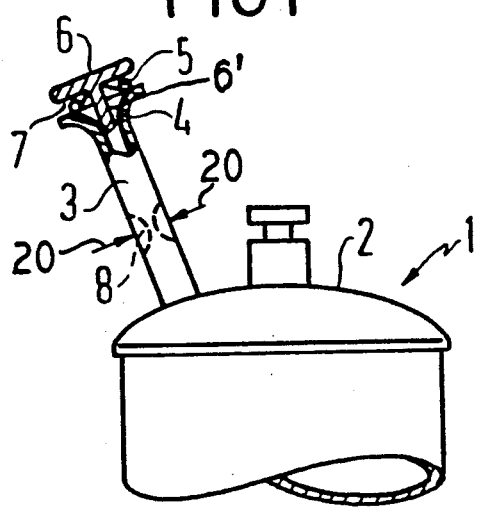
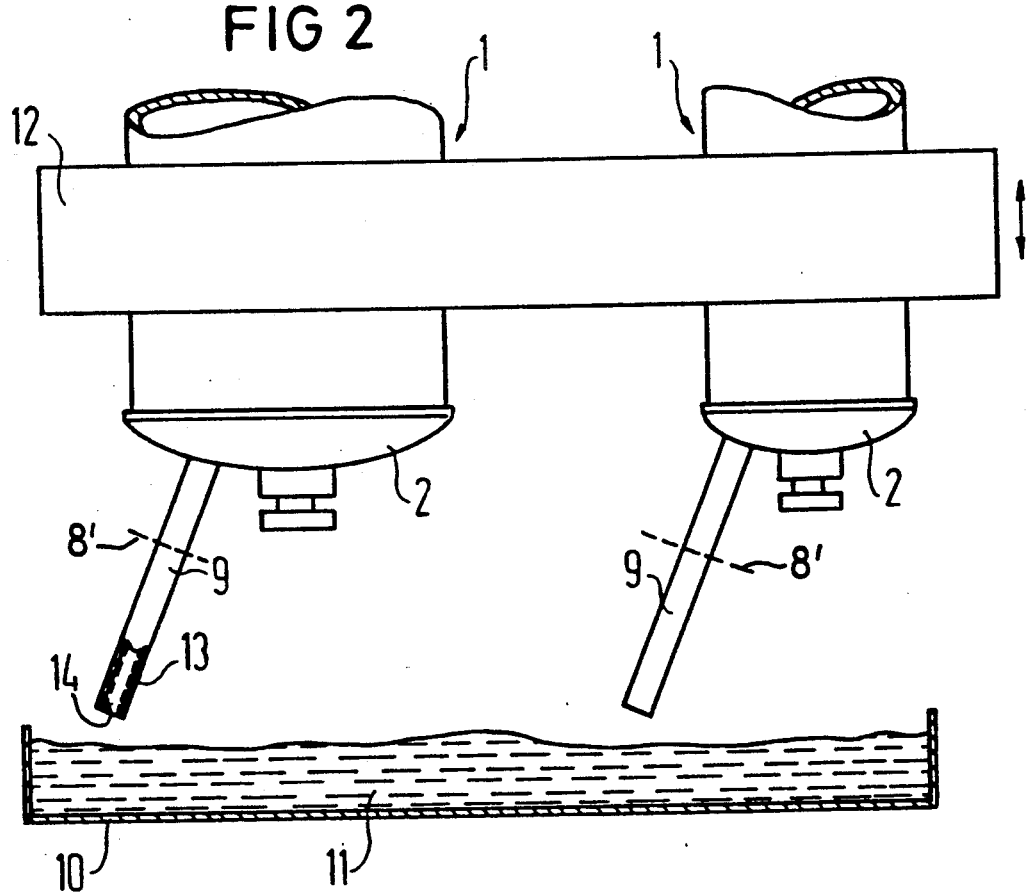

METHOD FOR MANUFACTURING A GAS LASER HAVING A VACUUM-TIGHT CLOSURE

BACKGROUND OF THE INVENTION

The present invention is directed to a method for manufacturing a gas laser that is closed vacuum-tight and is provided with a pump or filling tube which extends to an interior of the gas laser, the gas laser being evacuated through this tube and then subsequently filled with a laser gas, with the filling tube being subsequently closed by being pinched shut to form a cold-weld seal.

Siemens brochure entitled "Für die He-Ne-Lasertechnik: Röhren, Module, Stromversorgungen" dated 1986/87 discloses a gas laser tube which, as illustrated in FIG. 1, has a filling tube which is pinched off at its end and closed vacuum-tight as a result of this pinching off. U.S. Pat. No. 4,081,762, whose disclosure is incorporated herein by reference thereto, also discloses this type of gas laser tube. In the prior art, such lasers must be provided with what is referred to as a pump stem that are formed of a small tube and of a reinforcement situated at the end thereof. These pump stems must be individually clamped to the pump stand in order to be able to implement the steps of evacuation, heating and filling of the housing of the laser.

SUMMARY OF THE INVENTION

An object of the present invention is based on simplifying the manufacturing method for a laser, such as a He—Ne laser or an Ar laser. To accomplish this goal, the invention is directed to an improved method for manufacturing a gas laser that has a housing which is closed vacuum-tight, wherein the gas laser is provided with a pump tube or filling tube and that the laser is evacuated by the pump tube and is then filled with the laser gas through the tube. The improvements are that a plurality of lasers are arranged in a vacuum vessel, the vacuum vessel is evacuated and heated for baking the lasers, the laser gas is then subsequently introduced into the vacuum vessel, passes through the filling tube and into the interior of each of the gas laser tubes, each of the filling tubes are then closed vacuum-tight with a soft solder closure, while the laser tube is still in the vacuum vessel and then, after removal from the vacuum vessel, each of the filling tubes is pinched off between the soft solder closure and the laser housing, with the pinching off causing a cold-weld type of vacuum-tight seal of the filling tube and the removal of the part of the filling tube having the solder closure and projecting beyond the cold-weld location.

A soft solder closure can be manufactured in the vacuum vessel and the subsequent pinching and cold-welding guarantees a high quality of a proven vacuum-tight connection that is required by the customer.

An advantageous development of the method of the invention comprises that the mirrors of the laser are adjusted before the filling tube is pinched off and that if a laser is then recognized as not being gas-tight, it can be re-worked by melting the soft solder closure. After re-working, a subsequent repeated filling of the laser chamber can then be obtained. This was not possible with the prior art method of permanently sealing the filling tubes by pinching and cold-welding of the tube.

In one embodiment, the end of the pump tube is advantageously shaped with a flange-like opening, which flange-like opening receives a solder ring which is placed on the end and a plug is then plugged into the solder ring at this end. The solder ring is shaped so that at least one air gap to the interior of the tube will remain free. This arrangement is introduced in the vacuum chamber and after evacuation and heated and filled with the laser gas. Finally, the temperature in the vacuum chamber is raised to the soldering temperature so that the plug will sink into the softened solder under the influence of the force of gravity and close the filling tube vacuum-tight after cooling. This particular embodiment requires only a low outlay for the apparatus and it can be implemented in a vacuum chamber that is already present.

In order to produce a greater number of pieces, the method can be modified wherein a plurality of laser housings are introduced into a mount or mounting frame in a vacuum chamber with the filling tubes pointing downward. A vessel having soft solder is arranged under each of the pump tubes or filling tubes, which soft solder is brought to the soldering temperature. After evacuation of each of the laser housings, heating of the housings and then filling, the mount will be lowered so that the ends of each of the filling tubes will dip into the molten soft solder which will rise into the interior of each of the filling tubes. Subsequent to a solidification of the solder to seal each of the filling tubes, the lasers are removed from the vacuum chamber. After it is determined that the laser is correctly operable and that there is no necessity to obtain access to the interior of the housing, each of the filling tubes is then pinched off to form a cold-weld seal and the removal of the solder filled portion. The temperature in the vacuum vessel is advantageously lowered during the time when the pump tubes are immersed into the solder. As a result thereof, the soft solder will be drawn into the filling tube to a defined extent as a consequence of the gas pressure in the laser housing decreasing, in view of the decrease in temperature.

For a better wetability of the tubes, it is advantageous to provide a layer of silver/palladium, gold or silver in the end region to enable the wetting of the soft solder.

Other advantages and features of the invention will be readily apparent from the following description of the preferred embodiments, the drawings and claims.

BRIEF DESCRIPTION OF THE DRAWINGS

FIG. 1 is a side view of an end of a metal cap of a laser housing with portions broken away for purposes of illustrating the arrangement for closing the filling tube for the laser housing; and FIG. 2 is a side view of a mount for holding a plurality of laser housings in a vacuum chamber with portions broken away for purposes of illustration.

DESCRIPTION OF THE PREFERRED EMBODIMENTS

The principles of the present invention are particularly useful when incorporated in a laser, generally indicated at 1 in FIG. 1, which includes a housing having an end cap 2. The laser 1 can have an internal construction, such as known, for example, from U.S. Pat. No. 4,081,762, whose disclosure is incorporated herein by reference thereto, or an internal structure, such as illustrated in the above-mentioned Siemens sales brochure.

A metal cap 2 is provided with a filling tube or pump tube 3, which is secured to the cap in a vacuum-tight manner. An end 4 of the tube 3 has been flared outward to form a flange. A solder ring 5, which is bent to have a corrugated configuration in the circumferential direction is placed onto the end 4. A plug 6, which has a projection 6', is positioned with the projection 6' extending through the center of the ring 5 and into the interior of the tube 3. This is secured against slippage.

The solder ring 5 has a corrugated shape in the circumferential direction so that gaps 7, through which the laser housing can be evacuated and through which a laser gas can be admitted into the interior of the housing of the laser 1, will remain open. After the filling of the laser, the arrangement is heated to a soldering temperature, wherein the solder ring 5 will melt and the plug 6 will sink into the solder to form a vacuum-tight connection or solder closure in the end region of the tube 3 after a subsequent cooling of the solder back to a solid form. The plug 6 can be removed from the tube 3 by tilting or positioning the laser 1 with the plug 6 being positioned below the end 4 of the tube and then heating the solder location to the melting temperature for the solder so that the solder will become liquid and allow the plug to fall out. Thus, it is possible to reopen the interior of the housing in the event of a defect, such as an inadequate vacuum-tightness, to enable re-working the laser, refilling the laser and, in turn, resealing the laser housing.

After the laser 1 has been tested, the tube 3 will be pinched off in the directions of the arrow in the pinch zone 8, which pinching off will cause a cold-weld seal to be formed and a severing of the solder closure at the position of the arrows 20. The known and acknowledged high, long-term durability of the vacuum is guaranteed by such a cold-weld seal of the end of the tube, which cold-weld seal forms a permanent seal.

Another embodiment of the invention is illustrated in FIG. 2. In this embodiment, a plurality of housings for lasers 1 are held in a mount or mounting frame 12. Each of the end caps 2 of each of the housings is provided with a small, straight tube 9, which forms a pump tube or filling tube for each housing. A vessel 10, which contains solder 11 is positioned under the pump tubes 9. The tubes 9 do not dip into the solder, and this arrangement of the mount 12, as well as the container or vessel 10, are inserted into a vacuum chamber. Once inside the vacuum chamber, each of the housings of the lasers are evacuated because of evacuation of the vacuum chamber, then, subsequently, heating occurs for baking each of the housings and then, after heating, a filling of the vacuum chamber with the desired laser gas will result in each of the housings of the lasers 1 being filled with this gas, which will pass through each of the tubes 9.

After accomplishing the step of filling each of the housings, the mount or frame 12 is lowered in a direction toward the molten solder 11 so that the ends of each of the tubes 9 will dip into the molten solder, which is at the soldering temperature. The solder 11 will ascend or enter into each of the tubes and then the frame 12 is lifted to remove the tubes from the solder so that the solder can solidify and and close each of the tubes in a vacuum-tight manner with a solder closure. In order to promote the rise or entry of the solder 11 into each of the tubes 9, the temperature of the interior of each of the laser housings is advantageously lowered while the tubes 9 are dipped into the solder 11. This will create a pressure reduction in the laser housing, which reduction results in a sucking or drawing-in of the solder into the tubes.

A more improved embodiment is established when the tubes 9 have either a gold, silver or silver/palladium layer 14 on an inner wall surface in the end region. In particular, the silver/palladium layers, on the one hand, can still be easily soldered, even after a thermal treatment in air, for example during heating, and, on the other hand, do not dissolve in the soft solder so that no particular demand need be made of the management of the soldering process with respect to time and/or temperature.

As in the previous embodiment, subsequent to testing the laser and determining that there is no necessity for entering the gas-type enclosure of the tube, or to change the gas within the laser housing, the tube 9 can be subjected to a pinching off in the region of broken line 8' to form the cold-weld seal and to sever the portion of the tube extending beyond the line 8'. As mentioned above, this pinching off step is a conventional step known in the art.

Although various minor modifications may be suggested by those versed in the art, it should be understood that we wish to embody within the scope of the patent granted hereon all such modifications as reasonably and properly come within the scope of our contribution to the art.

We claim:

1. In a method for manufacturing a gas laser having a housing which is closed gas-tight, said housing being provided with a filling tube wherein the laser housing is evacuated through the filling tube and then filled through said tube, the improvements comprising a plurality of laser housings being arranged in a vacuum vessel, evacuating said vacuum vessel and heating the vessel to a evacuate the interior of each of the laser housings and to bake the laser housings, then introducing the laser gas into the vacuum vessel to fill the interior of each of the laser housings by a flow of the laser gas through the filling tube, subsequently forming a solder closure in each of the filling tubes by solidifying a molten solder in the end of the filling tube, removing the sealed laser housings from the vacuum vessel and then pinching off the filling tube between an end cap of the laser and the solder closure to form a cold-weld, vacuum-tight seal and to sever the solder closure from the laser housing.

2. In a method according to claim 1, which includes flaring an end of the filling tube to form an opening flange, said method including providing a solder ring being placed on the flanged end, and providing a plug having an extension extending through said solder ring into the tube, shaping one of the solder ring, plug and flanged end so that at least one air gap to the interior of the filling tube remains free, said step of introducing the laser housing into the vacuum vessel positioning the laser housing with the filling tube extending upright so that during the step of forming a solder closure, gravitational forces urge the plug into the molten solder ring to close the end of the tube so that following cooling and solidification of the solder, the plug and solder form the solder closure.

3. In a method according to claim 2, which includes coating an interior surface of an end of each of the tubes with a layer of material to facilitate wetting of the surface of the coated surface by said solder.

4. In a method according to claim 3, wherein said step of coating applies a layer of material selected from a group consisting of gold, silver and silver/palladium.

5. In a method according to claim 2, which includes prior to the step of pinching off providing resonator mirrors in the laser housing, adjusting said resonator mirrors and testing the gas-tight integrity of the laser housing so that, if necessary, the soft solder closure can be opened by melting to allow a reworking and/or refilling of the laser housing prior to performing the pinching off step.

6. In a method according to claim 1, wherein the step of introducing a plurality of laser housings provides a mounting frame for receiving and holding the plurality of laser housings with the filling tubes extending downward, inserting the mounting frame in the vacuum chamber along with a vessel containing soft solder, which is positioned below the filling tubes, subsequent to introducing the laser gas through the filling tubes, heating the container of soft solder to a temperature melting the solder, lowering the mounting frame to dip the ends of each of the filling tubes into the molten solder, raising the mounting frame to remove the ends and allow the soft solder in the ends of the tubes to solidify to form the solder closure, then, subsequent to forming the solder closure, removing the laser housings from the vacuum chamber prior to pinching off to form the cold-weld seal.

7. In a method according to claim 6, wherein the method includes lowering the temperature in the vacuum chamber during the time the mount frame is lowered to insert the ends of the pump tubes into the solder so as to cause a suction within each of the laser housings to draw the molten solder into the ends of the tubes.

8. In a method according to claim 7, which includes coating the interior of each of the filling tubes with a material to promote wetting by the solder.

9. In a method according to claim 8, wherein the material is selected from a group consisting of gold, silver and silver/palladium.

10. In a method according to claim 6, which includes coating the internal surface at the ends of each of the filling tubes with a material to promote wetting by the soft solder.

11. In a method according to claim 10, wherein the material is selected from a group consisting of silver, gold and silver/palladium.

12. In a method according to claim 1, which includes providing the resonator mirrors and adjusting these mirrors prior to the pinching off step and including checking the gas-tight integrity of the laser prior to the pinching off step and, if necessary, melting the soft solder closure to re-work and refill the container prior to the pinching off step.

13. In a method according to claim 12, wherein the step of inserting a plurality of laser housings includes positioning them in a mounting frame with the filling tubes projecting downward, introducing said mounting frame into the vacuum chamber, providing a vessel containing soft solder and introducing it into the vacuum chamber to be below the ends of the filling tubes, heating the soft solder in said vessel to the solder melting temperature prior to forming the solder closure, and then forming the solder closure by lowering the mounting frame to dip each of the ends of the filling tubes into the molten soft solder and then raising the frame to withdraw the ends to allow the ends to solidify to form the soft solder closure.

14. In a method according to claim 13, which includes lowering the temperature of the vacuum vessel during the step of inserting the ends of the filling tubes into the molten solder to cause the molten solder to be drawn into the ends of the tube.

15. In a method according to claim 13, which includes coating the inner surfaces of the ends of each of the filling tubes with a material to promote wetting by the soft solder, with said material being selected from a group consisting of silver, gold and silver/palladium.

* * * * *